(12) United States Patent
Holker (10) Patent No.: US 11,390,205 B2
(45) Date of Patent: Jul. 19, 2022

(54) TRAILER AND BOAT COVERING COMBINATION SYSTEM

(71) Applicant: Brett C Holker, Monticello, MN (US)

(72) Inventor: Brett C Holker, Monticello, MN (US)

( * ) Notice: Subject to any disclaimer, the term of this patent is extended or adjusted under 35 U.S.C. 154(b) by 207 days.

(21) Appl. No.: 16/933,450

(22) Filed: Jul. 20, 2020

(65) Prior Publication Data
US 2022/0017007 A1 Jan. 20, 2022

(51) Int. Cl.
*B60P 3/10* (2006.01)
*B60J 7/12* (2006.01)

(52) U.S. Cl.
CPC .............. *B60P 3/1041* (2013.01); *B60J 7/12* (2013.01)

(58) Field of Classification Search
CPC .... B60J 7/12; B60J 7/102; B60J 7/085; B60P 7/04
USPC ...................... 296/98; 410/97, 100
See application file for complete search history.

(56) References Cited

U.S. PATENT DOCUMENTS

| 4,030,780 | A | * | 6/1977 | Petretti | ............ B60J 7/085 160/67 |
| 4,223,414 | A | | 9/1980 | Dickson | |
| 4,934,302 | A | | 6/1990 | Harper | |
| 5,058,946 | A | | 10/1991 | Faber | |
| 5,481,999 | A | | 1/1996 | Clark | |
| 8,123,274 | B1 | * | 2/2012 | Edwards | ............ B60J 7/10 114/361 |
| 8,246,066 | B1 | * | 8/2012 | Allen | ............ B60P 3/10 280/414.1 |
| 9,527,552 | B2 | * | 12/2016 | Hey | ............ B60J 7/085 |
| 2007/0102951 | A1 | | 5/2007 | Chenowth | |
| 2009/0267381 | A1 | | 10/2009 | Huddleston | |
| 2012/0187712 | A1 | * | 7/2012 | Bromberek | ............ B60J 7/085 296/98 |
| 2017/0043652 | A1 | * | 2/2017 | Poyntz | ............ B60J 7/067 |

FOREIGN PATENT DOCUMENTS

FR  2890916 A1 * 3/2007 ............... B60J 7/08

OTHER PUBLICATIONS

Bourcet et al., "Description of FR2890916", Mar. 2007 (Year: 2007).*

* cited by examiner

*Primary Examiner* — D Glenn Dayoan
*Assistant Examiner* — Veronica M Shull (57) ABSTRACT

A trailer and boat covering combination system includes a trailer including a frame having a front end, a first lateral member and a second lateral member. A plurality of wheels is rotatably attached to and extends downwardly from the frame. A pair of supports is attached to the trailer such that each of the first and second lateral members has one of the supports attached thereto. A spindle is attached to and extends between the supports. The supports are pivotable forwardly and rearwardly relative to the trailer such that the spindle is movable over the trailer. The supports are biased toward an upright position. A covering is positioned on the spindle and is unwound off of the spindle to cover a boat positioned on the trailer. The covering is wound back onto the spindle to store the covering on the spindle.

8 Claims, 11 Drawing Sheets

TRAILER AND BOAT COVERING COMBINATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to boat covering device and more particularly pertains to a new boat covering device for facilitating the positioning of a covering onto a boat which can be accomplished quickly and easily by a single person.

(2) Description of Related Art Including Information Disclosed Under 37 CFR 1.97 and 1.98

The prior art relates to boat coverings that are used for protecting a boat from the elements and damage during traveling. Such coverings may include devices to assist a person in placing the coverings on a boat. However, these devices are not easily movable relative to a trailer and therefore do not provide an effective means for protecting a boat with a cover.

BRIEF SUMMARY OF THE INVENTION

An embodiment of the disclosure meets the needs presented above by generally comprising a trailer including a frame having a front end, a first lateral member and a second lateral member. A plurality of wheels is rotatably attached to and extends downwardly from the frame. A pair of supports is attached to the trailer such that each of the first and second lateral members has one of the supports attached thereto. A spindle is attached to and extends between the supports. The supports are pivotable forwardly and rearwardly relative to the trailer such that the spindle is movable over the trailer. The supports are biased toward an upright position. A covering is positioned on the spindle and is unwound off of the spindle to cover a boat positioned on the trailer. The covering is wound back onto the spindle to store the covering on the spindle.

In another embodiment, a trailer includes a frame that has a front end, a first lateral member and a second lateral member. A plurality of wheels is rotatably attached to and extends downwardly from the frame. A pair of supports is attached to the trailer such that each of the first and second lateral members has one of the supports attached thereto. The supports are movable laterally away from or toward the trailer. A spindle is attached to and extends between the supports. The supports are pivotable forwardly and rearwardly relative to the trailer such that the spindle is movable over the trailer. The spindle has an adjustable length. A covering is positioned on the spindle and is configured to be unwound from the spindle to cover a boat positioned on the trailer. The covering is wound back onto the spindle to store the covering on the spindle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 11 thereof, a new boat covering device embodying the principles and concepts of an embodiment of the disclosure and generally designated by the reference numeral 10 will be described.

Figure 1:
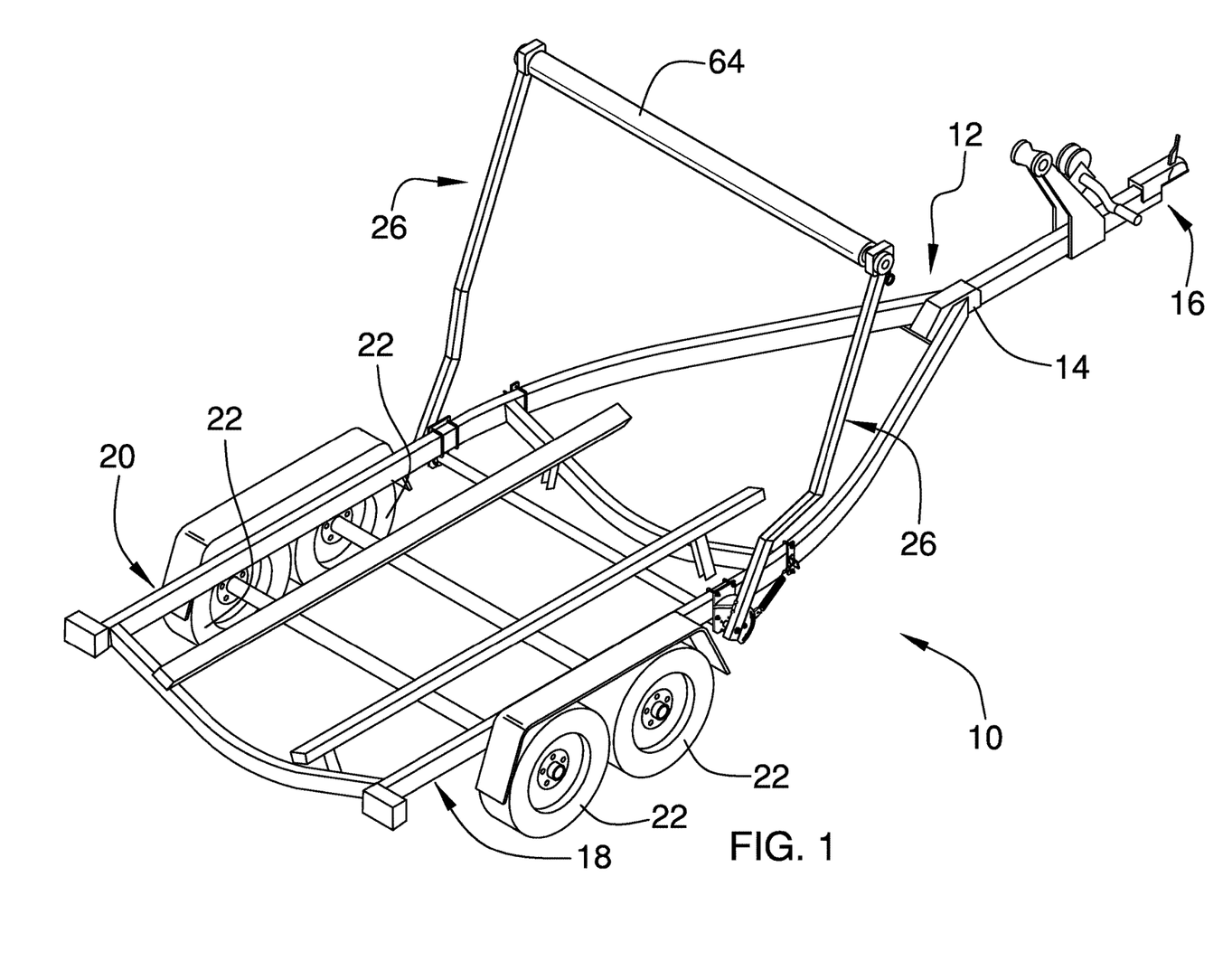
FIG. 1 is a top isometric view of a trailer and boat covering combination system according to an embodiment of the disclosure.

As best illustrated in FIGS. 1 through 11, the trailer and boat covering combination system 10 generally comprises, as shown in FIG. 1, a trailer 12 that includes a frame 14 having a front end 16, a first lateral member 18 and a second lateral member 20. A plurality of wheels 22 is rotatably attached to and extends downwardly from the frame 14. The trailer 12 will most often comprise a conventional boat trailer and therefore the front end 16 will typically include a tongue for engaging a trailer hitch and a jack for supporting the front end 16. The wheels 22 may include brakes and bunks or rollers for holding a boat 24 that may be mounted on top of the trailer 12, while a bow stop and winch are positioned adjacent to the front end 16 for engaging the bow of the boat 24.

A pair of supports 26 is attached to the trailer 12 such that each of the first 18 and second 20 lateral members has one of the supports 26 attached thereto. The supports 26 are positioned in a central area spaced from the front end 16 and a rear end 28 of the trailer 12 and are located outside of an area bounded by the frame 14. The supports 26 are pivotable with respect to the trailer 12 such that they can tilt rearwardly and forwardly relative to the trailer 12 and relative to an upward position generally extending upwardly from the trailer 12. A spindle 30 is attached to and extends between the supports 26 and holds a covering 32 that can be unwound from the spindle 30 to cover the boat 24 as the spindle 30 travels over the boat 24. The covering 32 may then be wound back onto the spindle 30 as the covering 32 is removed from the boat 24.

The supports 26 may further be laterally movable with respect to the trailer 12 such that that the supports 26, when positioned completely forward or rearward, may be moved inwardly toward the trailer 12. Boat trailers 12 and boats 24 are typically sized such that their width does not exceed a maximum allowed size for a public roadway. In order for the supports 26 to clear the sides of a boat 24, the supports 26 must be positioned laterally outside of this width while moving across the rear and central areas of the boat 24. Once the supports 26 extend completely forward or rearward, the supports 26 can be slid laterally inward to decrease the width that the supports 26 add to the overall structure of the trailer 12.

The supports 26 may further be laterally movable with respect to the trailer 12 such that that the supports 26, when positioned completely forward or rearward, may be moved inwardly toward the trailer 12. Boat trailers 12 and boats 24 are typically sized such their width does not exceed a maximum allowed size for a public roadway. In order for the supports 26 to clear the sides of a boat 24, the supports 26 must be positioned laterally outside of this width while moving across the rear and central areas of the boat 24. Once the supports 26 extend completely forward or rearward, the supports 26 can be slid laterally inward to decrease the width that the supports 26 add to the overall structure of the trailer 12.

In one embodiment, each of the supports 26 includes an axle 34 that is rotatably coupled to the frame 12. The axle 34 has an exterior end 36 with respect to the frame 12. The axle 34 may be laterally movable with respect to the frame 12, for reasons indicated above, such that a distance between the exterior end 36 and the frame 12 is selectively alterable. As can be seen in the Figures, the axle 34 may be rotatably extended through a mount 38 attached to the frame 12 and be extendable into a sleeve 40. The sleeve 40 may extend between the first 18 and second 20 lateral members or may comprise a housing for receiving the axle 34 wherein each of the first 18 and second 20 lateral members includes one of the housings.

Figure 10:
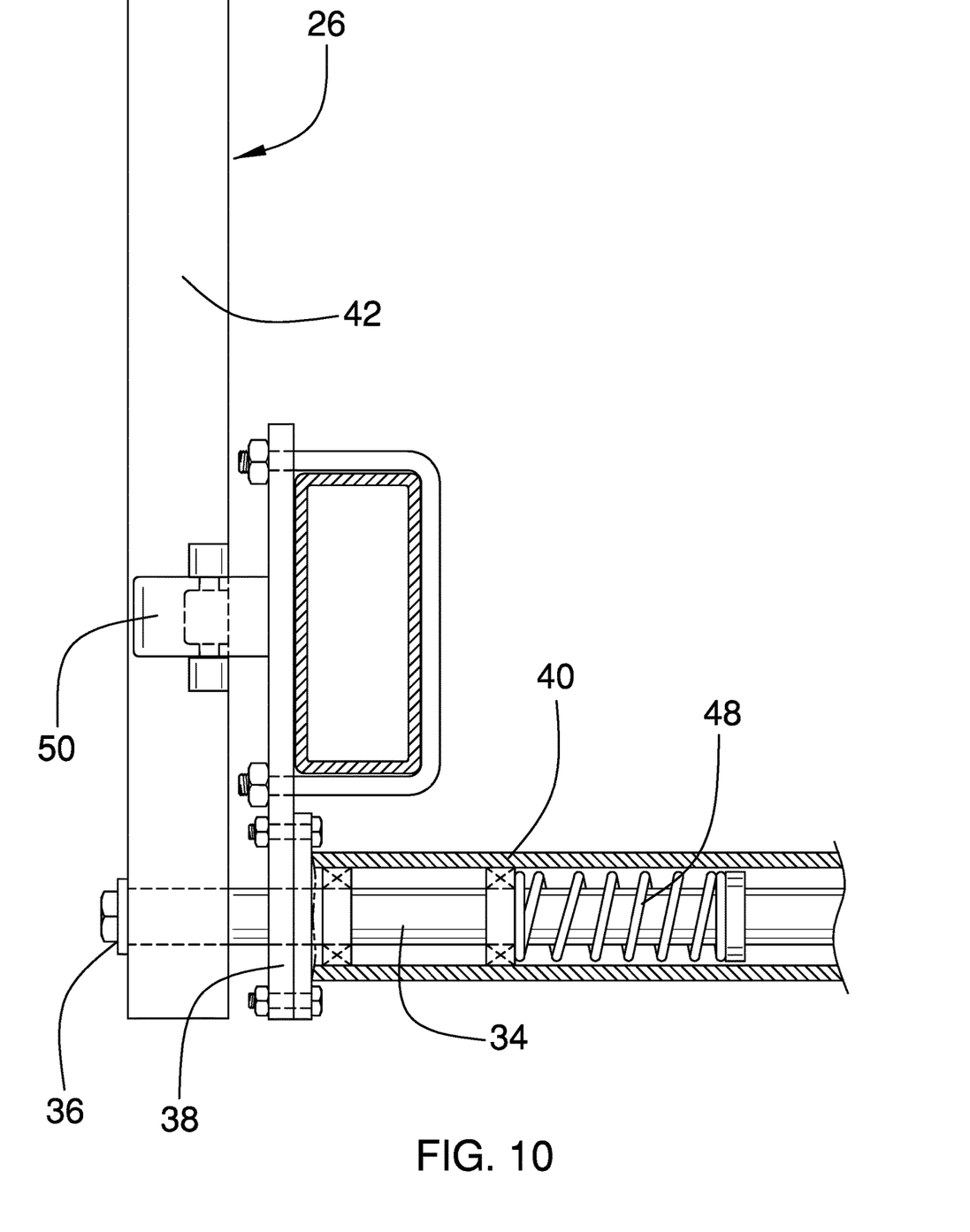
FIG. 10 is a cross-sectional view taken along line 10-10 of FIG. 8 of an embodiment of the disclosure.
Figure 11:
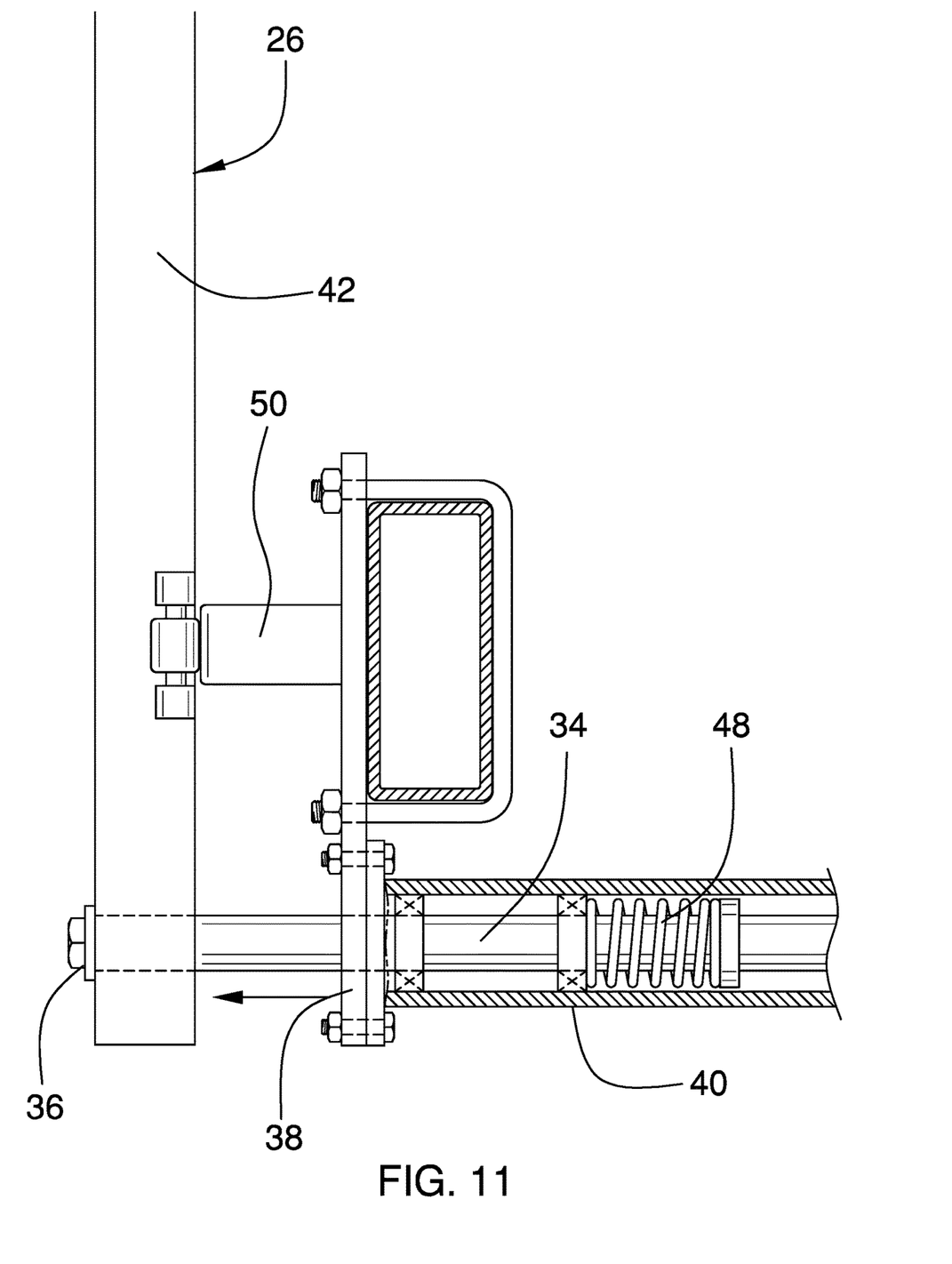
FIG. 11 is a cross-sectional view taken along line 11-11 of FIG. 9 of an embodiment of the disclosure.

The supports 26 each comprise a post 42 that has a lower end 44 and an upper end 46. The lower end 44 is attached to the axle 34 such that the post 42 extends upwardly from the axle 34. The post 42 is pivotable from the upward position to a forward position and pivotable from the upward position to a rearward position. An urging member 48, such as a spring, may engage the axle 34 to urge the axle 34 inwardly toward the trailer 12. If the urging member 48 is utilized, a cam 50 may be mounted on the trailer 12 such that the post 42 moves along the cam 50 as the spindle 30 is moved back and forth over the trailer 12. Thus, when the post 42 is tilted forward, the cam 50 allows the post 42 to move inwardly toward the frame 12. While the cam 50 of FIG. 6 only allows the posts 42 to move inward laterally when tilted forward, the cam 50 may be reversed or allow for lateral movement of the posts 42 at both the forward and rearward positions. The post 42 will typically include one or more bends or curves to allow the posts 42 to further facilitate clearance of the sides of the boat. FIGS. 10 and 11 include an embodiment wherein the urging member 48 is a spring abutted against a stop on the axle 34. If the system 10 includes a single axle 34 for both supports 26, the axle may be telescopic to allow for length adjustments as the posts 42 move relative to the trailer 12.

Figure 3:
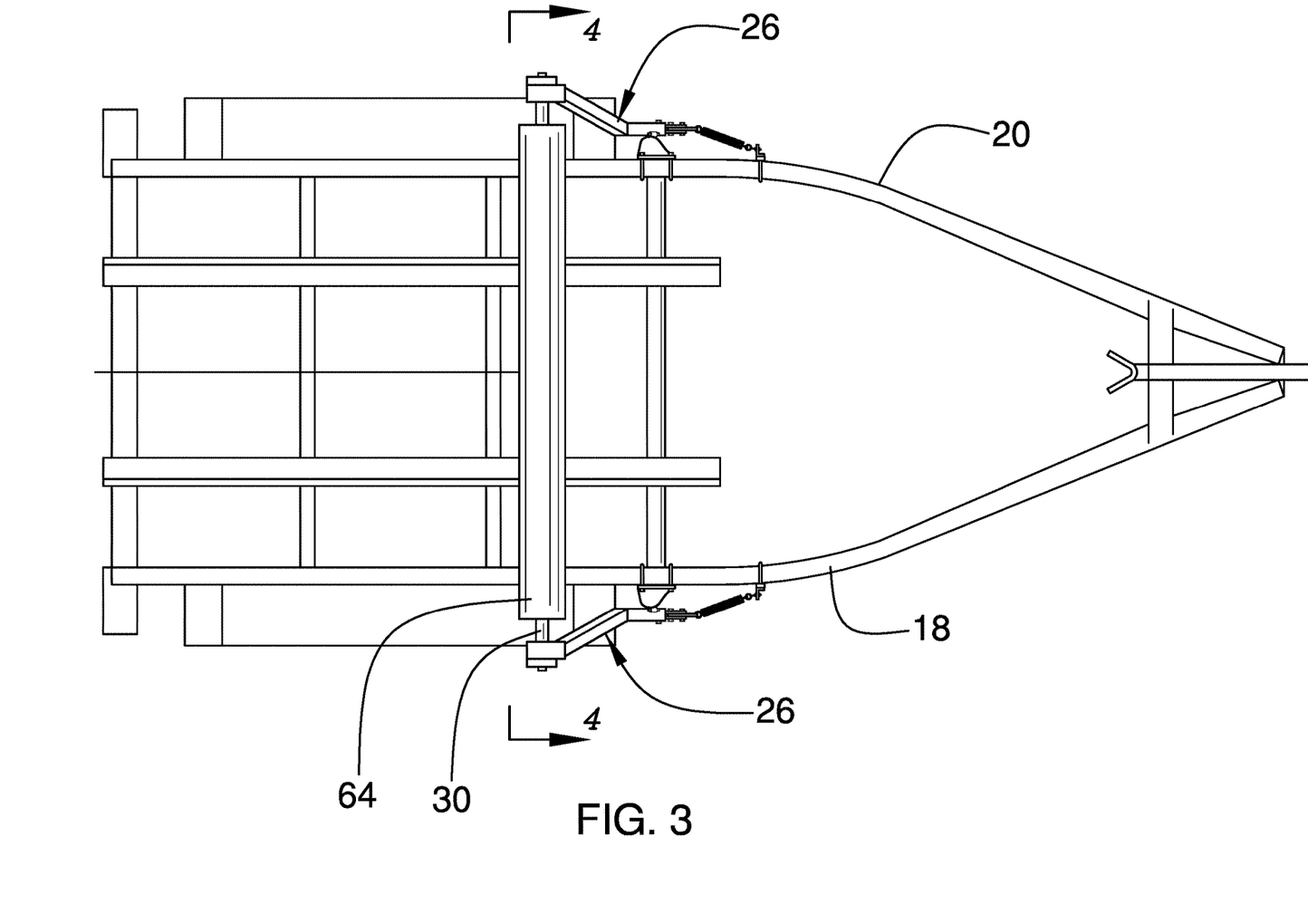
FIG. 3 is a top view of an embodiment of the disclosure.
Figure 4:
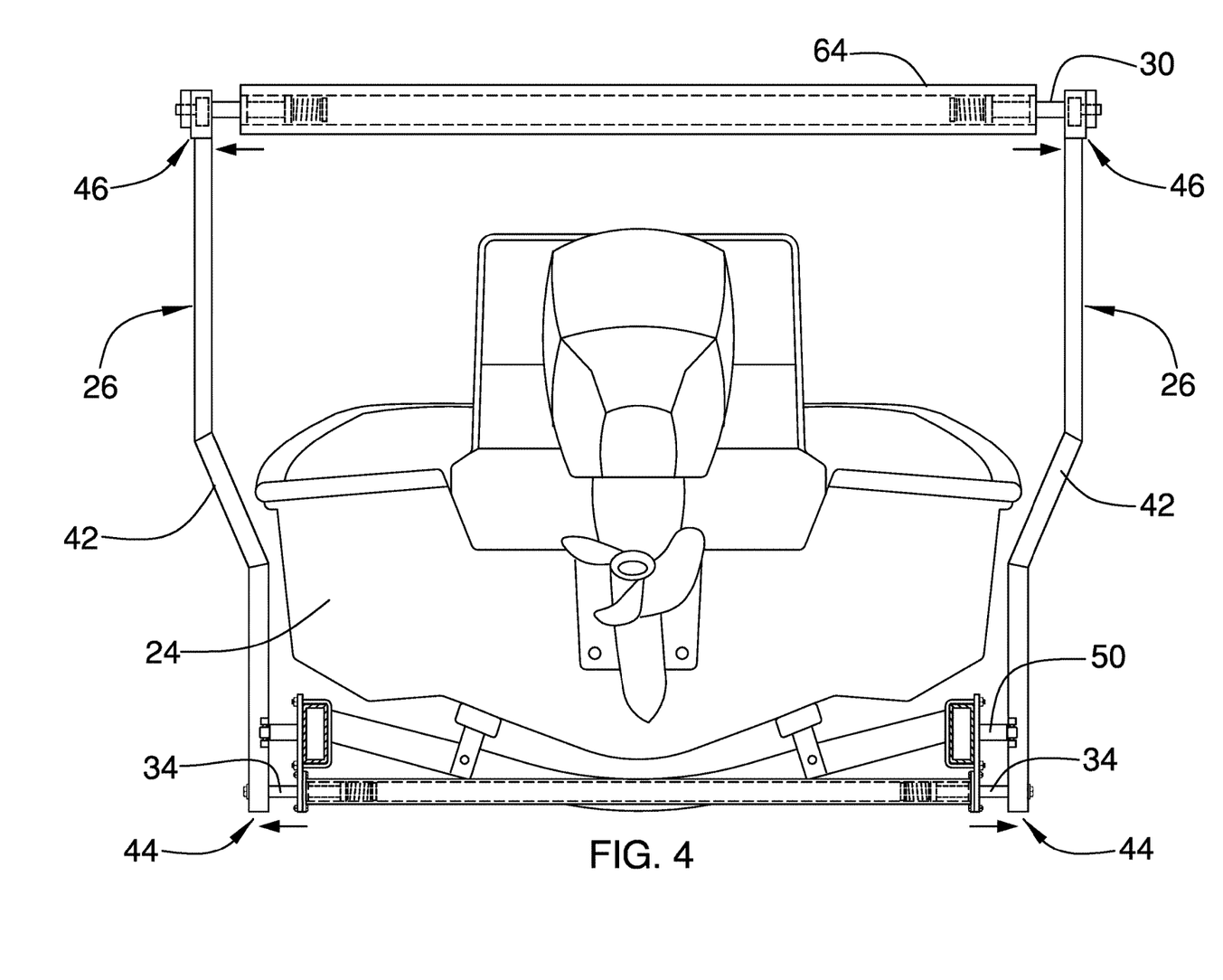
FIG. 4 is a cross-sectional view of an embodiment of the disclosure taken along line 4-4 of FIG. 3.
Figure 5:
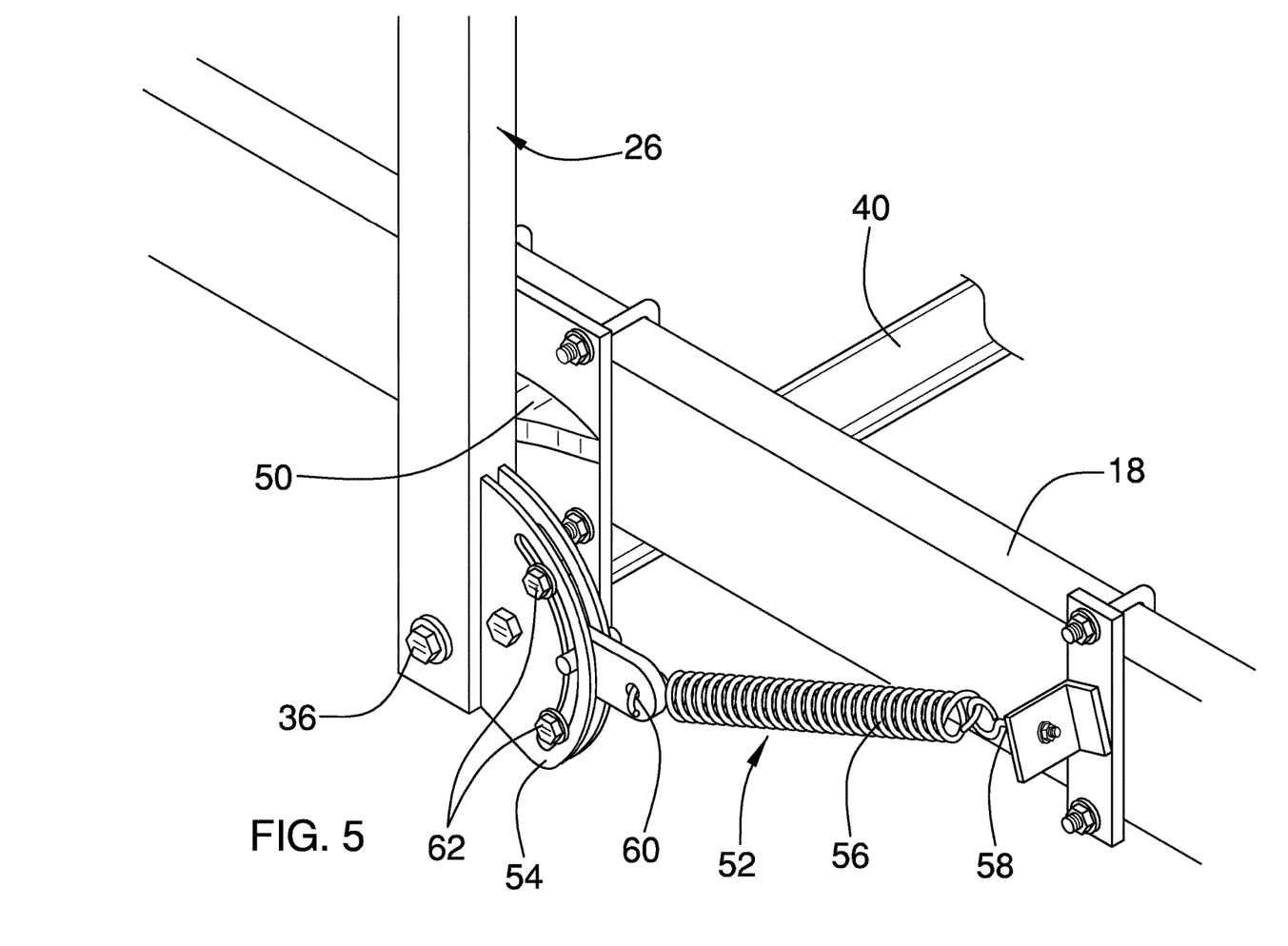
FIG. 5 is a front isometric view of a support linkage of an embodiment of the disclosure.
Figure 6:
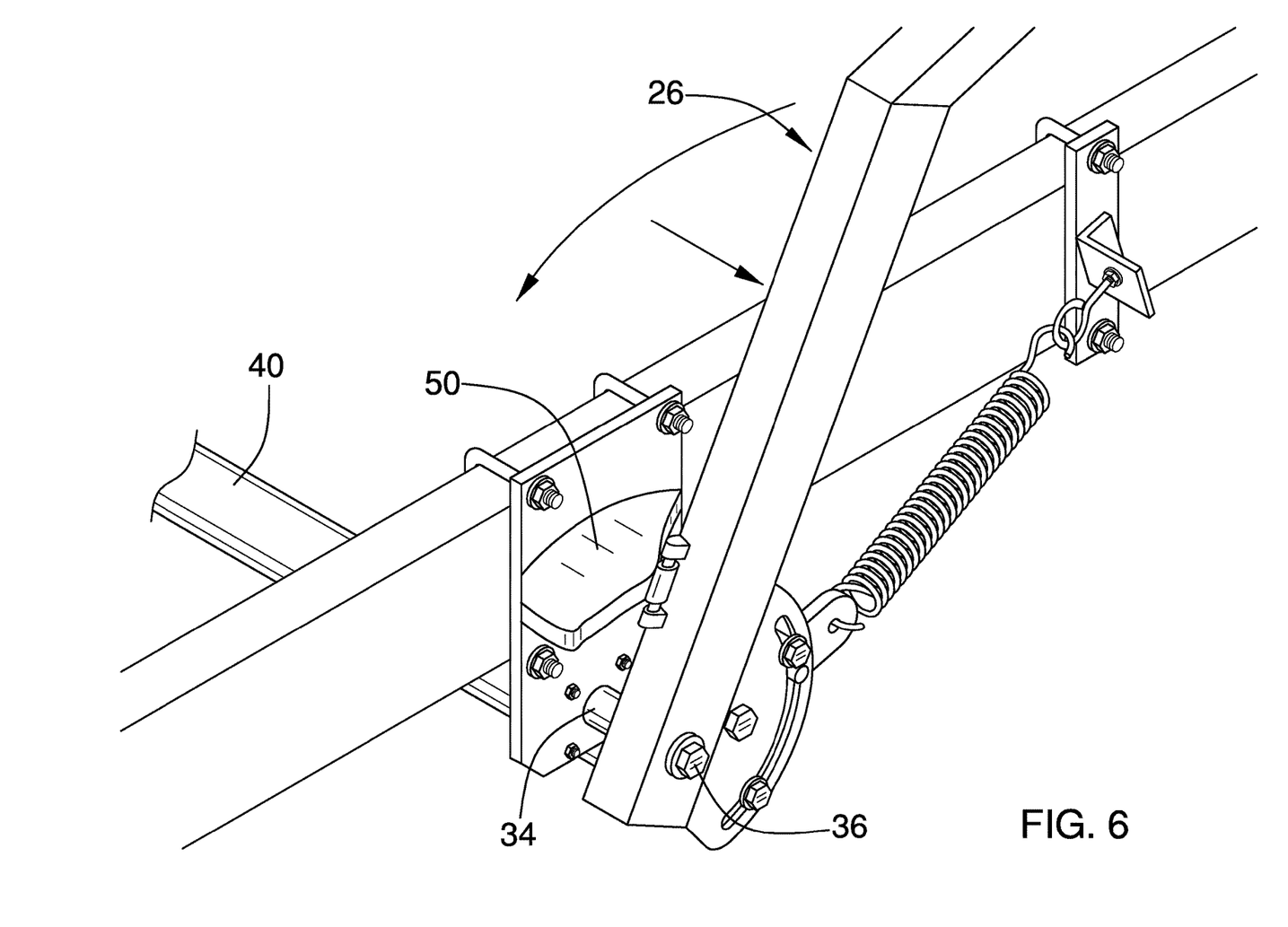
FIG. 6 is a rear isometric view of the support linkage of an embodiment of the disclosure.
Figure 7:
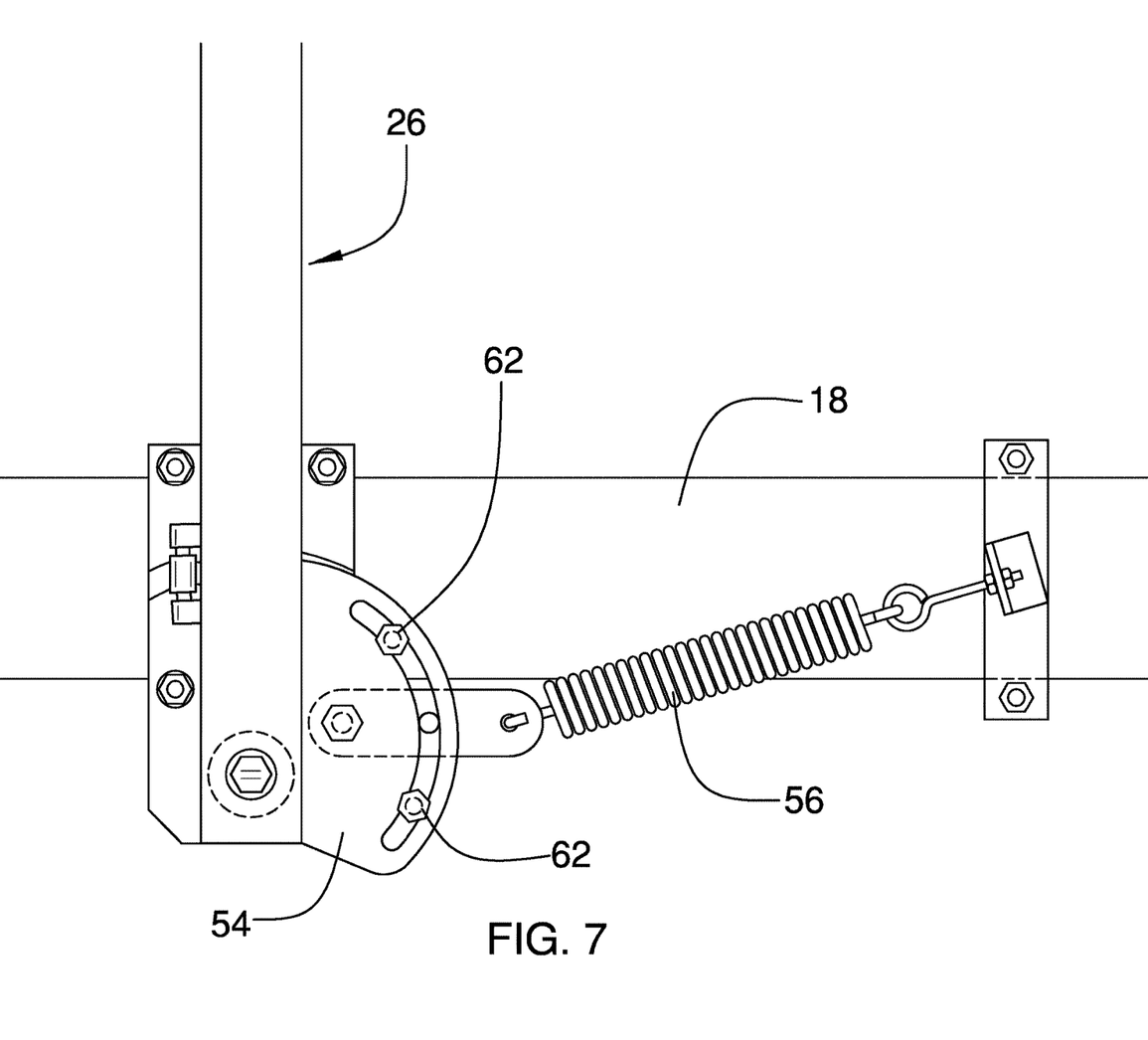
FIG. 7 is a side view of the support linkage of an embodiment of the disclosure.
Figure 8:
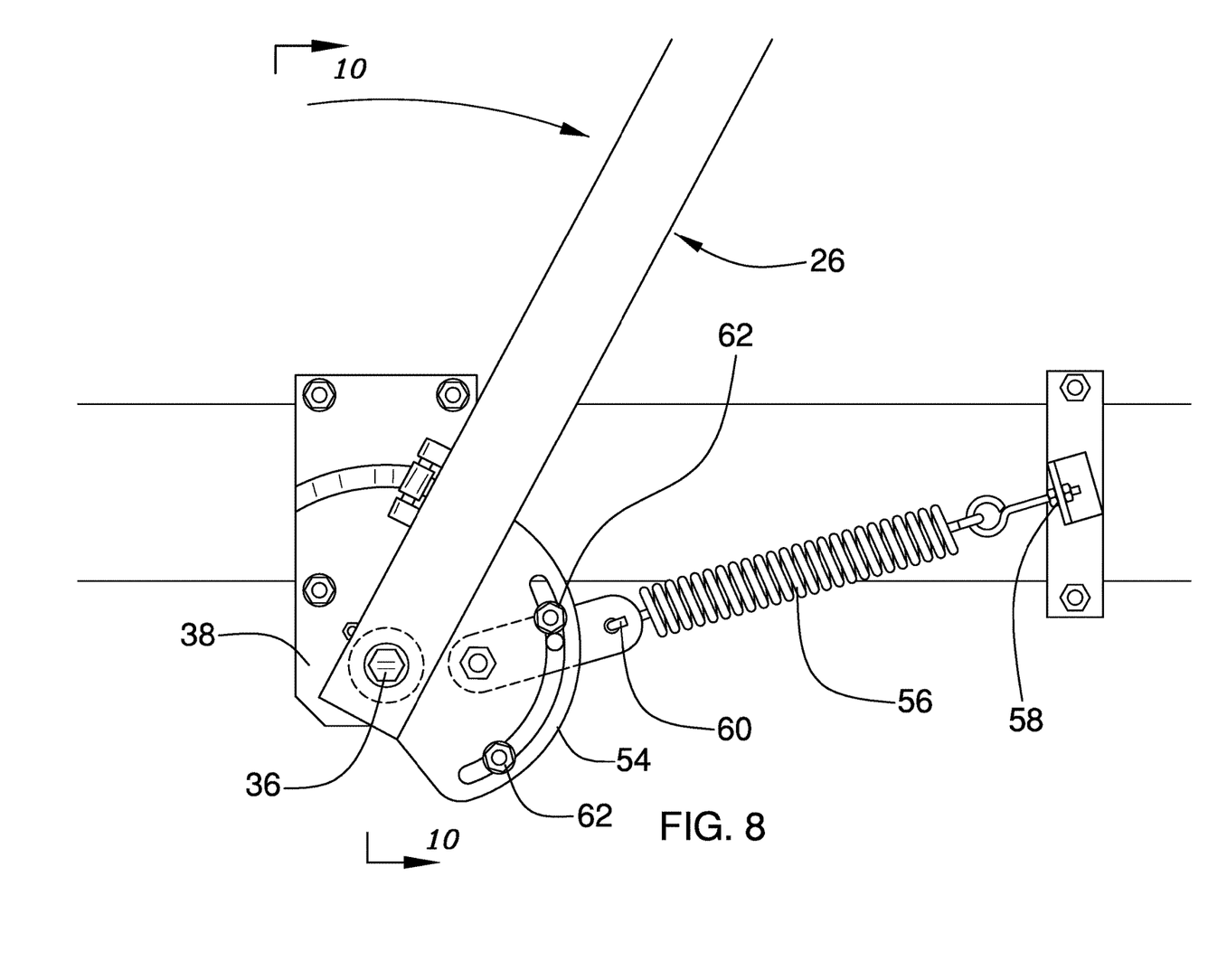
FIG. 8 is a side view of the support linkage of an embodiment of the disclosure.
Figure 9:
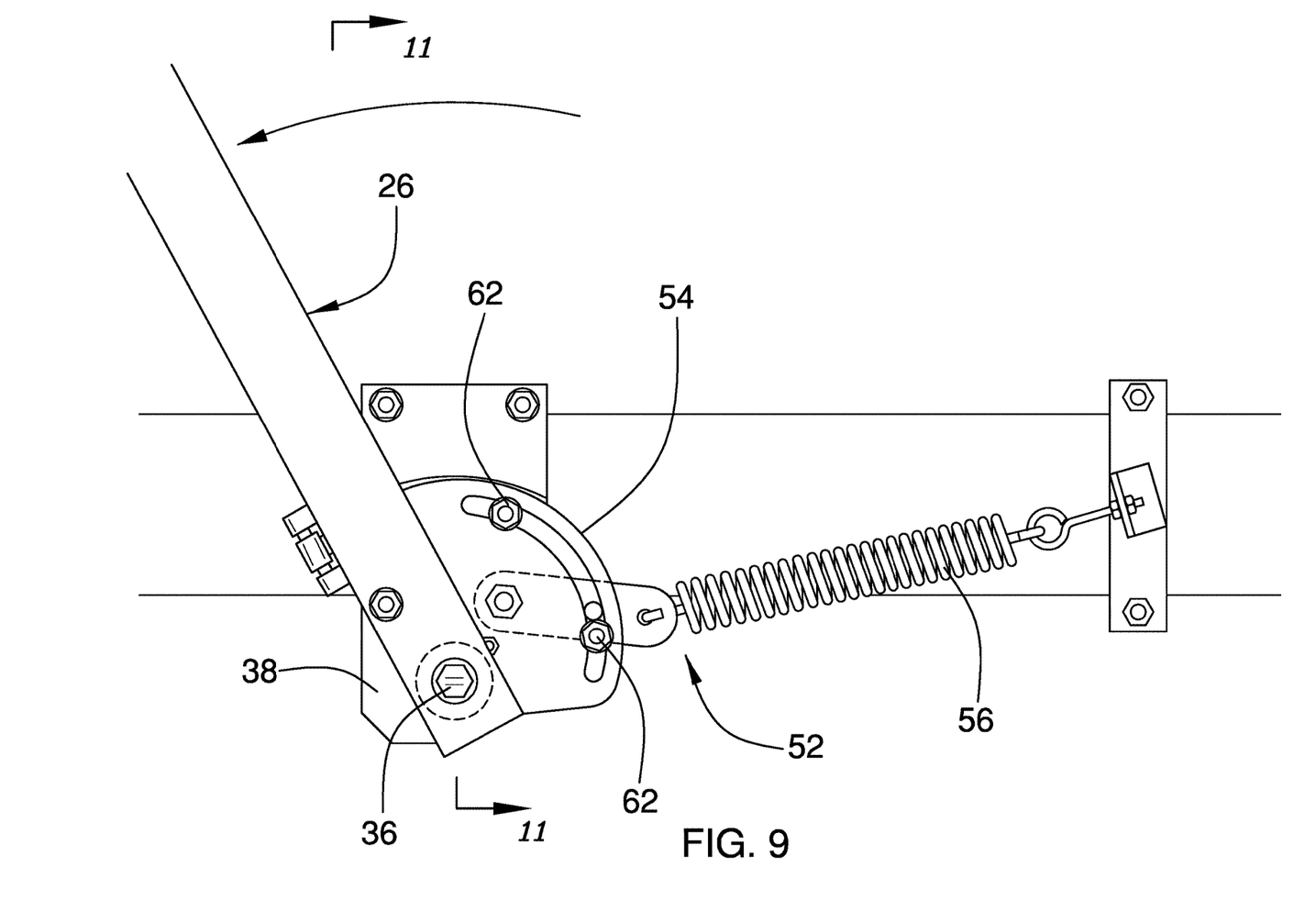
FIG. 9 is a side view of the support linkage of an embodiment of the disclosure.

A biasing assembly 52 is attached to the post 42 and biases the post 42 toward the upward position to facilitate movement of the post 42 from the forward and rearward positions to the upright position. In one embodiment, the biasing assembly 52 comprises a bracket 54 that is mounted on the post 42. A spring 56 has an anchored end 58 attached to the trailer 12 or other fixed point that remains in a fixed position during the movement of the post. A second end 60 of the spring 56 is attached to the bracket 54. The spring 56 urges the post 42 toward the upright position as shown in FIGS. 3 and 4. The second end 60 is movable between a pair of stops 62 on the bracket 54 and the stops may be adjustable to allow a user to adjust an upward position arc length that is not affected by the spring 56. Because each of the supports 26 includes a biasing assembly 52, the stops 62 define a free area of pivoting within the upright position to prevent the springs 56 from interfering with the movement from an upright position to either forward or rearward positions. This would otherwise be a concern as the user of the system 10 will only be gripping one of the posts 42 and the other post 42 and its attached spring 56 could counter the movements the user is attempting to effect.

The spindle 30 is attached to the post of each of the supports 26 adjacent to a respective upper end 46 of the posts 42. To allow for the posts 42 to move laterally inward relative to the posts 42, the spindle 30 will have an adjustable length. This may be accomplished with, for example, a telescopic spindle 30. The spindle 30 may be rotatably coupled to the posts 42 or a cylinder 64, that is rotatable, may be mounted on the spindle 30 and thereafter the covering 32 on the cylinder 64. The spindle 30 may also be coupled to the posts 42 with a rotatable gear that can be engaged with an electric or pneumatic tool for rotating the spindle 30 or cylinder 64 and winding the covering 32 onto the spindle 30 or cylinder. However, an electric motor coupled to the spindle 30 may also be utilized. The covering 32 itself is of a flexible material that is conventional for covering and protecting a boat 24. The covering 34 may therefore include a canvas material or plastic material.

Figure 2:
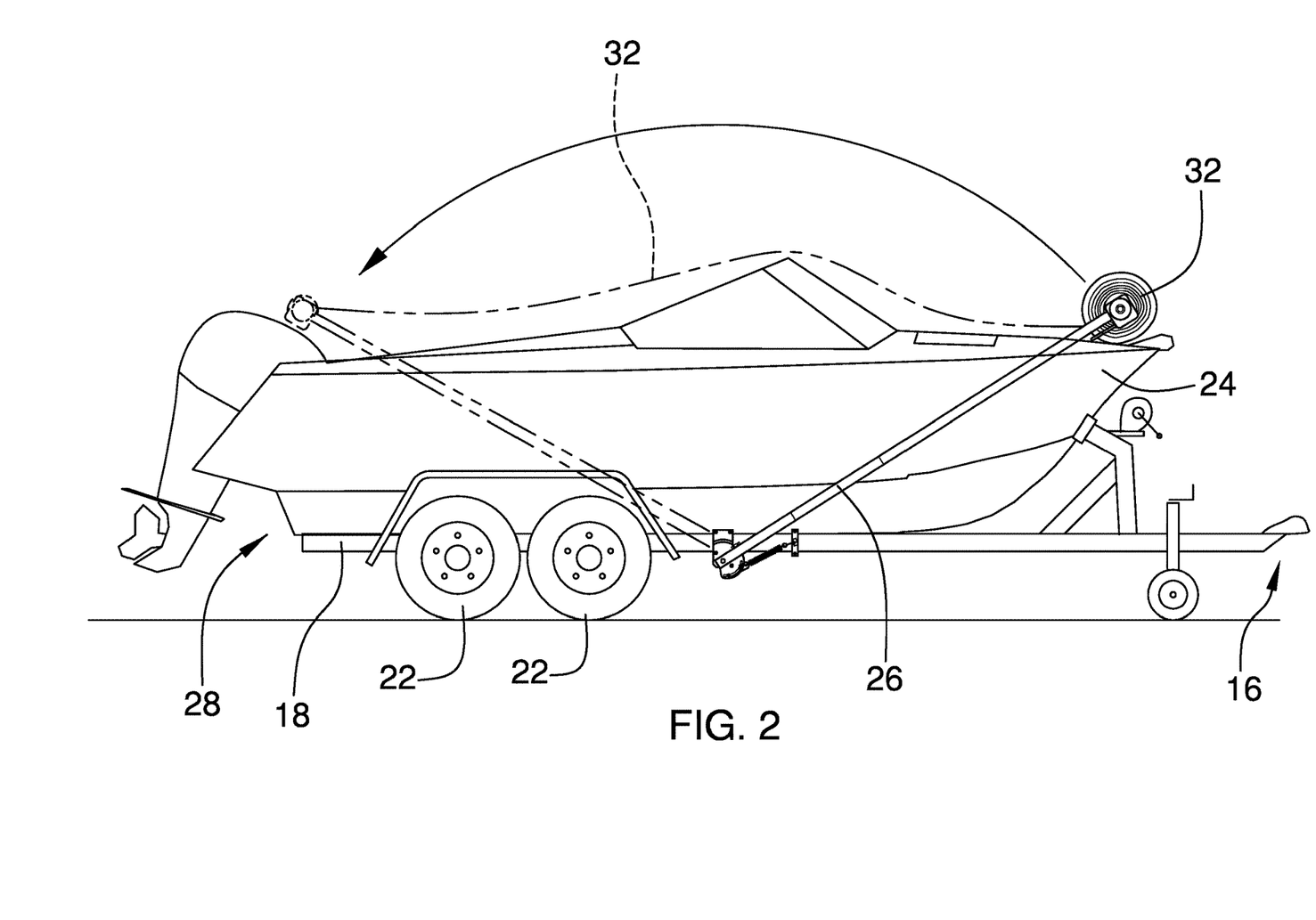
FIG. 2 is a side view of an embodiment of the disclosure.

In use, the trailer 12 is used in a conventional manner to hold and transport the boat 24. When a user of the system 10 wishes to cover the boat 24, the supports 26 are moved from the forward position as shown in FIG. 2 to the rearward position (shown in phantom in FIG. 2) as the covering 32 is unwound from the spindle 30. It should be understood that the opposite direction may be utilized wherein the covering 32 is unwound from the rearward position to the forward position and thus the terms "forward position" and "rearward position" may be interchangeable. In the embodiment shown in FIG. 6, when the supports 32 are positioned forward, the posts 42 are moved inward laterally to reduce the width of the system 10 as it is driven on a road. As mentioned, other embodiments may allow the posts 42 to move inwardly when the posts are moved to the rearward position. Regardless of the orientation of the embodiments, an opposite action with the supports 26 is taken to wind the covering 32 back onto the spindle 30. Once the covering 32 is placed on the spindle 30, the supports 26 can be moved as needed to allow movement of the boat onto and off of the trailer as well as to move the posts 42 laterally with respect to the trailer 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A boat covering system configured for selective covering of a boat, said system comprising:
   a trailer including a frame having a front end, a first lateral member and a second lateral member, a plurality of wheels being rotatably attached to and extending downwardly from said frame;
   a pair of supports being attached to said trailer such that each of said first and second lateral members has one of said supports attached thereto;
   a spindle being attached to and extending between said supports, said supports being nivotable forwardly and rearwardly relative to said trailer such that said spindle is movable over said trailer, said supports being biased toward an upright position;
   a covering being positioned on said spindle, said covering being configured to be unwound off of said spindle to cover a boat positioned on said trailer, said covering being wound back onto said spindle to store said covering on said spindle; and
   wherein each of said supports includes:
      an axle being rotatably coupled to said frame, said axle having an exterior end with respect to said frame, said axle being laterally movable with respect to said frame such that a distance between said exterior end and said frame is selectively alterable; and
      a post having a lower end and an upper end, said lower end being attached to said axle such that said post extends upwardly from said axle, said post being pivotable from an upward position to a forward position and pivotable from the upward position to a rearward position, said spindle being attached to said post of each of said supports adjacent to a respective upper end.

2. The boat covering system according to claim 1, wherein each of said supports further includes a biasing assembly being attached to said post and biasing said post toward said upward position to facilitate movement of said post from said forward and rearward positions to said upright position.

3. The boat covering system according to claim 2, wherein said biasing assembly comprises:
   a bracket being mounted on said post; and
   a spring having an anchored end being attached to said trailer, said spring has a second end attached to said bracket, said spring urging said post toward said upright position, said second end being movable between a pair of stops on said bracket, said stops being adjustable to define a free area of pivoting within said upright position.

4. The boat covering system according to claim 1, wherein said supports are movable laterally away from or toward the trailer.

5. A boat covering system configured for selective covering of a boat, said system comprising:
   a trailer including a frame has a front end, a first lateral member and a second lateral member, a plurality of wheels being rotatably attached to and extending downwardly from said frame; and
   a pair of supports being attached to said trailer such that each of said first and second lateral members has one of said supports attached thereto, said supports being movable laterally away from or toward the trailer;
   a spindle being attached to and extending between said supports, said supports being pivotable forwardly and rearwardly relative to said trailer such that said spindle is movable over said trailer, said spindle has an adjustable length;
   a covering being positioned on said spindle, said covering being configured to be unwound off of said spindle to cover a boat positioned on said trailer, said covering being wound back onto said spindle to store said covering on said spindle.

6. The boat covering system according to claim 5, wherein said supports are biased toward an upright position.

7. The boat covering system according to claim 6, wherein said supports are freely movable within an area defining said upright position.

8. A boat covering system configured for selective covering of a boat, said system comprising:
   a trailer including a frame having a front end, a first lateral member and a second lateral member, a plurality of wheels being rotatably attached to and extending downwardly from said frame;
   a pair of supports being attached to said trailer such that each of said first and second lateral members has one of said supports attached thereto, each of said supports including:

an axle being rotatably coupled to said frame, said axle having an exterior end with respect to said frame, said axle being laterally movable with respect to said frame such that a distance between said exterior end and said frame is selectively alterable;

a post having a lower end and an upper end, said lower end being attached to said axle such that said post extends upwardly from said axle, said post being pivotable from an upward position to a forward position and pivotable from the upward position to a rearward position;

a biasing assembly being attached to said post and biasing said post toward said upward position to facilitate movement of said post from said forward and rearward positions to said upright position, said biasing assembly comprising;

a bracket being mounted on said post;

a spring having an anchored end attached to said trailer, said spring has a second end attached to said bracket, said spring urging said post toward said upright position, said second end being movable between a pair of stops on said bracket, said stops being adjustable to define a free area of pivoting within said upright position;

a spindle being attached to and extending between said supports, said spindle being attached to said post of each of said supports adjacent to a respective upper end, said spindle has an adjustable length; and a covering being positioned on said spindle, said covering being configured to be unwound off of said spindle to cover a boat positioned on said trailer, said covering being wound onto said spindle to store said covering on said spindle.

* * * * *